US012732808B2

(12) United States Patent
Nakada

(10) Patent No.: US 12,732,808 B2
(45) Date of Patent: Sep. 8, 2026

(54) VEHICLE, IN-VEHICLE DEVICE, AND MANAGEMENT METHOD

(71) Applicant: HONDA MOTOR CO., LTD., Tokyo (JP)

(72) Inventor: Naoki Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 383 days.

(21) Appl. No.: 17/404,237

(22) Filed: Aug. 17, 2021

(65) Prior Publication Data

US 2021/0377734 A1 Dec. 2, 2021

Related U.S. Application Data

(63) Continuation of application No. PCT/JP2019/007111, filed on Feb. 25, 2019.

(51) Int. Cl.

*H04W 12/06* (2021.01)
*B60R 25/24* (2013.01)

(Continued)

(52) U.S. Cl.

CPC ............ *H04W 12/06* (2013.01); *B60R 25/24* (2013.01); *G06F 21/35* (2013.01); *H04L 9/08* (2013.01);

(Continued)

(58) Field of Classification Search

CPC ... B60R 25/2018; B60R 25/24; B60R 25/241; H04W 12/041; H04W 12/047;

(Continued)

(56) References Cited

U.S. PATENT DOCUMENTS 5,889,603 A * 3/1999 Roddy ............... G07C 9/00182 398/171
6,160,488 A * 12/2000 Honda .................... B60R 25/04 340/5.65

(Continued)

FOREIGN PATENT DOCUMENTS

CN 105976466 A * 9/2016 ......... G07C 9/00309
CN 109070840 A * 12/2018 ............. B60Q 1/482

(Continued)

OTHER PUBLICATIONS

Choi Ra Woon et al. KR-20140000050-A (machine translation). Jan. 2, 2014. (Year: 2014).*

(Continued)

*Primary Examiner* — Michael Simitoski
(74) *Attorney, Agent, or Firm* — THOMAS | HORSTEMEYER, LLP

(57) ABSTRACT

A vehicle configured to cancel restriction of at least one function, which includes restriction of a function enabling an actuation of a power unit of the vehicle, by unlock of a first key, the vehicle performing: receiving a registration request of a second key that is an electronic key from a communication terminal by short distance wireless communication, determining, on condition that the vehicle is unlocked by the first key, whether to accept the received registration request, and authenticating the second key concerning the registration request in a case where it is determined to accept the registration request and registering the authenticated second key.

14 Claims, 9 Drawing Sheets

(51) Int. Cl.

| | |
|---|---|
| ***G06F 21/35*** | (2013.01) |
| ***H04L 9/08*** | (2006.01) |
| ***H04W 4/40*** | (2018.01) |
| ***H04W 4/80*** | (2018.01) |
| ***H04W 12/041*** | (2021.01) |
| ***H04W 12/047*** | (2021.01) |
| ***H04W 12/47*** | (2021.01) |
| ***H04W 60/00*** | (2009.01) |

(52) U.S. Cl.
CPC ............ *H04L 9/088* (2013.01); *H04L 9/0891* (2013.01); *H04W 4/40* (2018.02); *H04W 4/80* (2018.02); *H04W 12/041* (2021.01); *H04W 12/047* (2021.01); *H04W 12/47* (2021.01); *H04W 60/00* (2013.01)

(58) Field of Classification Search
CPC ....... H04W 12/06; H04W 12/63; H04W 4/40; H04W 4/80; H04W 60/00; H04L 9/08; H04L 9/088; H04L 9/0891
See application file for complete search history.

(56) References Cited

U.S. PATENT DOCUMENTS

| | | | | |
|---|---|---|---|---|
| 8,947,202 | B2 * | 2/2015 | Tucker | B60R 16/037 340/5.72 |
| 9,252,951 | B1 * | 2/2016 | Katzer | G07C 9/00571 |
| 9,424,451 | B2 * | 8/2016 | Kalhous | H04W 4/80 |
| 9,428,127 | B2 * | 8/2016 | Cooper | E05F 15/77 |
| 9,499,125 | B2 * | 11/2016 | Akay | B60R 25/01 |
| 9,779,564 | B2 * | 10/2017 | Nagel | G07C 9/00309 |
| 9,902,368 | B2 | 2/2018 | Maiwand et al. | |
| 10,220,814 | B2 | 3/2019 | Mitsubayashi | |
| 10,304,100 | B2 | 5/2019 | Sasa | |
| 10,438,255 | B2 | 10/2019 | Sasa | |
| 10,538,220 | B1 * | 1/2020 | Tyagi | B60R 25/245 |
| 10,850,704 | B2 * | 12/2020 | Suda | B60R 25/24 |
| 10,878,468 | B2 | 12/2020 | Sasa | |
| 11,797,909 | B2 * | 10/2023 | Endo | G06V 20/59 |
| 2002/0186144 | A1 * | 12/2002 | Meunier | G07B 15/00 340/901 |
| 2003/0137398 | A1 * | 7/2003 | Shibata | E02F 9/24 340/5.72 |
| 2004/0263316 | A1 * | 12/2004 | Dix | B60R 25/04 340/5.23 |
| 2005/0052276 | A1 * | 3/2005 | Kumazaki | G07C 9/00944 340/5.6 |
| 2007/0200660 | A1 * | 8/2007 | Endo | B60R 25/24 340/5.23 |
| 2007/0200671 | A1 * | 8/2007 | Kelley | B60R 25/257 455/420 |
| 2008/0224824 | A1 * | 9/2008 | Yoshizawa | B60R 25/24 340/5.61 |
| 2010/0306549 | A1 * | 12/2010 | Ullmann | G07C 9/00857 713/185 |
| 2011/0311052 | A1 * | 12/2011 | Myers | H04L 63/10 380/270 |
| 2013/0099892 | A1 * | 4/2013 | Tucker | H04L 9/08 340/5.61 |
| 2014/0129301 | A1 * | 5/2014 | Van Wiemeersch | G07B 15/02 705/13 |
| 2014/0277837 | A1 * | 9/2014 | Hatton | H04L 63/0853 701/2 |
| 2014/0379509 | A1 | 12/2014 | Sasa | |
| 2015/0148989 | A1 * | 5/2015 | Cooper | E05F 15/77 701/2 |
| 2015/0161832 | A1 * | 6/2015 | Esselink | G07C 9/00571 340/5.22 |
| 2016/0055699 | A1 * | 2/2016 | Vincenti | H04W 12/04 340/5.61 |
| 2016/0119961 | A1 * | 4/2016 | Hrabak | H04W 76/14 455/41.2 |
| 2016/0247339 | A1 * | 8/2016 | Miller | B60R 25/24 |
| 2016/0300417 | A1 * | 10/2016 | Hatton | G07C 9/00857 |
| 2016/0318481 | A1 * | 11/2016 | Penilla | B60L 53/68 |
| 2016/0344747 | A1 * | 11/2016 | Link | H04W 4/021 |
| 2016/0371907 | A1 * | 12/2016 | Ma | E05B 81/80 |
| 2017/0104589 | A1 * | 4/2017 | Lambert | H04L 9/3268 |
| 2017/0186251 | A1 * | 6/2017 | Lee | G07C 9/00571 |
| 2017/0352214 | A1 * | 12/2017 | Maiwand | G07C 9/00896 |
| 2018/0009416 | A1 | 1/2018 | Maiwand et al. | |
| 2018/0091930 | A1 * | 3/2018 | Jefferies | G07C 9/00571 |
| 2018/0213405 | A1 * | 7/2018 | Jung | H04W 12/069 |
| 2018/0262891 | A1 * | 9/2018 | Wu | H04W 12/065 |
| 2018/0361991 | A1 | 12/2018 | Mitsubayashi | |
| 2019/0001926 | A1 * | 1/2019 | Arakawa | B60R 25/241 |
| 2019/0009747 | A1 * | 1/2019 | Guo | B60R 25/04 |
| 2019/0039567 | A1 * | 2/2019 | Froitzheim | B60R 25/24 |
| 2019/0111890 | A1 * | 4/2019 | Terashima | H04L 67/12 |
| 2019/0118769 | A1 * | 4/2019 | Tamane | B60R 25/24 |
| 2019/0143941 | A1 * | 5/2019 | Inami | H04L 9/3226 340/5.28 |
| 2019/0184936 | A1 * | 6/2019 | Uenoyama | B60R 25/24 |
| 2019/0184939 | A1 * | 6/2019 | Hioki | G07C 9/00309 |
| 2019/0197468 | A1 * | 6/2019 | Endo | G06Q 10/0832 |
| 2019/0197471 | A1 * | 6/2019 | Endo | G06Q 10/0835 |
| 2019/0197905 | A1 * | 6/2019 | Yanagida | G08G 1/144 |
| 2019/0205816 | A1 * | 7/2019 | Sakurada | G06Q 20/14 |
| 2019/0236666 | A1 | 8/2019 | Sasa | |
| 2019/0299932 | A1 * | 10/2019 | Porteret | G06V 40/10 |
| 2019/0318275 | A1 * | 10/2019 | Sakurada | G06Q 10/02 |
| 2020/0005371 | A1 | 1/2020 | Sasa | |
| 2020/0029213 | A1 * | 1/2020 | Nölscher | B60R 25/24 |
| 2020/0079322 | A1 * | 3/2020 | Crocker | G07C 9/00571 |
| 2020/0221301 | A1 * | 7/2020 | Takeda | G08C 17/02 |
| 2020/0339067 | A1 * | 10/2020 | Kim | H04L 67/125 |
| 2020/0361335 | A1 * | 11/2020 | Penilla | G06Q 30/00 |
| 2021/0082013 | A1 | 3/2021 | Sasa | |
| 2021/0350641 | A1 * | 11/2021 | Otican | G07C 9/20 |
| 2021/0400481 | A1 * | 12/2021 | Narumi | H04Q 9/00 |
| 2022/0094676 | A1 * | 3/2022 | Hofmann | H04L 63/062 |

FOREIGN PATENT DOCUMENTS

| | | | | | |
|---|---|---|---|---|---|
| CN | 109391470 | A | * | 2/2019 | B60R 25/2018 |
| EP | 3392433 | A1 | | 10/2018 | |
| JP | 2003064920 | A | | 3/2003 | |
| JP | 2004088338 | A | * | 3/2004 | |
| JP | 2004187096 | A | * | 7/2004 | B60R 25/04 |
| JP | 2005206048 | A | | 8/2005 | |
| JP | 2008072160 | A | * | 3/2008 | |
| JP | 2009293283 | A | | 12/2009 | |
| JP | 2010138579 | A | * | 6/2010 | |
| JP | 2012-162914 | A | | 8/2012 | |
| JP | 2012149472 | A | * | 8/2012 | |
| JP | 2012171472 | A | * | 9/2012 | |
| JP | 5233942 | B2 | * | 7/2013 | |
| JP | 2014209348 | A | * | 11/2014 | G06Q 10/02 |
| JP | 2014227741 | A | | 12/2014 | |
| JP | 2015055107 | A | | 3/2015 | |
| JP | 2016133969 | A | | 7/2016 | |
| JP | 2016-188500 | A | | 11/2016 | |
| JP | 2018104917 | A | * | 7/2018 | |
| KR | 20140000050 | A | * | 1/2014 | |
| WO | 2013/099964 | A1 | | 7/2013 | |
| WO | 2020174544 | A1 | | 9/2020 | |

OTHER PUBLICATIONS

Kanzawa Mitsuhiko. JP-2014209348-A (machine translation). Nov. 6, 2014. (Year: 2014).*

Toyota Motor Corp. JP-5233942-B2 (machine translation). Jul. 10, 2013. (Year: 2013).*

Yasumi Hidekazu et al. JP-2008072160-A (machine translation). Mar. 27, 2008. (Year: 2008).*

Zhang, Yu-feng et al. CN-105976466-A (machine translation). Sep. 28, 2016. (Year: 2016).*

Ikeda Yoko et al. JP-2004187096-A (machine translation). Jul. 2, 2004. (Year: 2004).*

(56) References Cited

OTHER PUBLICATIONS

Umeda Fumio. JP-2004187096-A (machine translation). Mar. 18, 2004. (Year: 2004).*
Berrunbach, R P. CN-109391470-A (machine translation), Feb. 26, 2019. (Year: 2019).*
Ikeda, K. JP-2010138579-A (machine translation), Jun. 24, 2010. (Year: 2010).*
Nagae, T. JP-2012149472-A (machine translation), Aug. 9, 2012. (Year: 2012).*
Koga. K. JP-2012171472-A (machine translation), Sep. 10, 2012. (Year: 2012).*
Kato, T. JP-2018104917-A (machine translation), Jul. 5, 2018. (Year: 2018).*
Johannes Geir Kristinsson et al. CN 109070840 A (machine translation), published Dec. 21, 2018. (Year: 2018).*
Extended European Search Report for European Patent Application No. 19916557.2 mailed Feb. 18, 2022.
Japanese Office Action for Japanese Patent Application No. 2021-501401 mailed May 9, 2022 (partially translated).
International Search Report and Written Opinion for PCT/JP2019/007111 mailed Mar. 26, 2019.
International Preliminary Report on Patentability for PCT/JP2019/007111 mailed Mar. 5, 2020.

* cited by examiner 101
16
13
22a, 22b
15
FB
40
3
26
27
29
12
21
22
CT
17
X
REAR
FRONT
18
UPPER
Z
LOWER
14
7b
23
RB F I G. 5
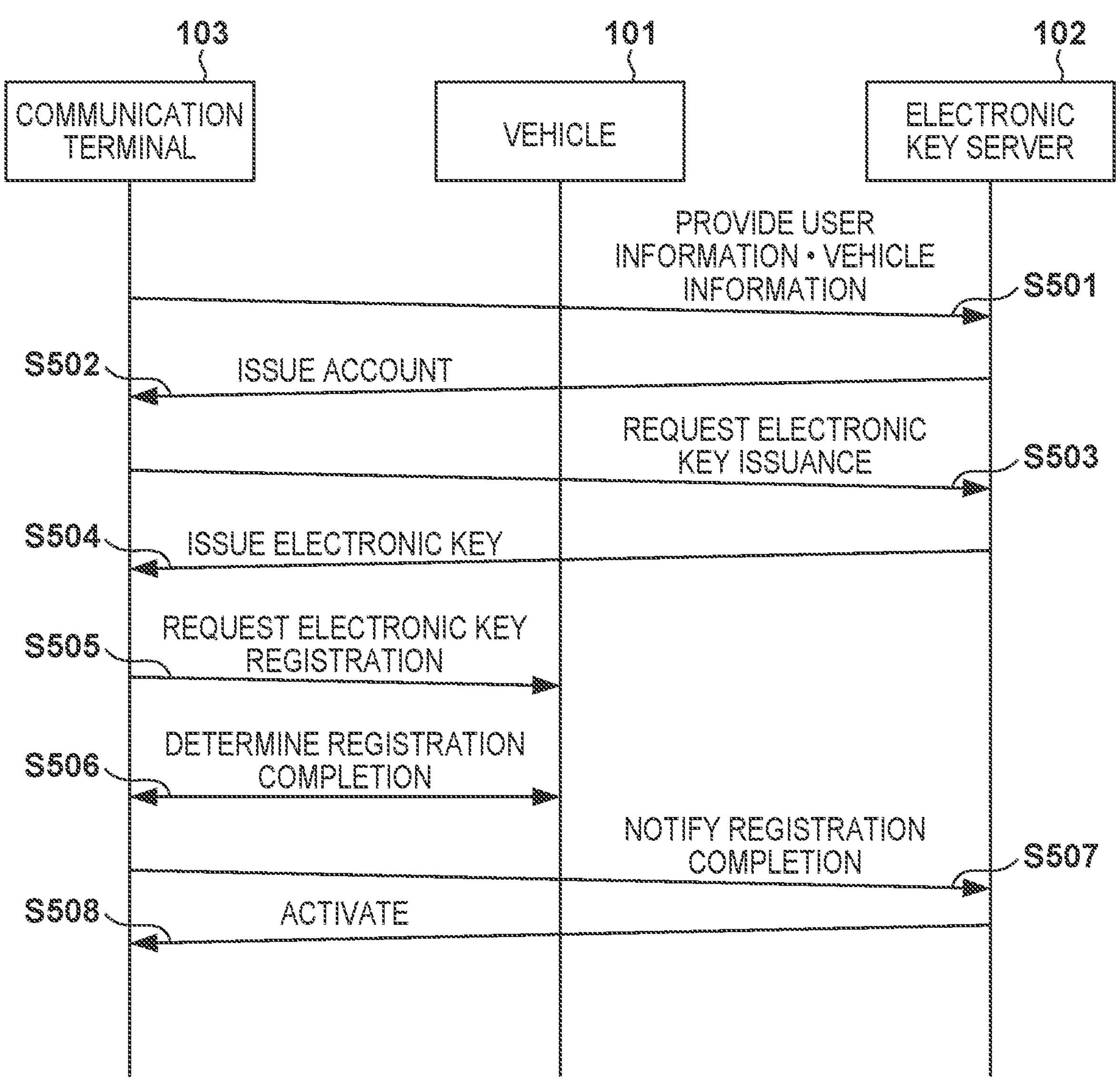

101
3
3a
27
3b
18
3c
7b
UPPER
Z
LOWER
REAR
X
FRONT

VEHICLE, IN-VEHICLE DEVICE, AND MANAGEMENT METHOD

CROSS-REFERENCE TO RELATED APPLICATION(S)

This application is a continuation of International Patent Application No. PCT/JP2019/007111 filed on Feb. 25, 2019, the entire disclosures of which are incorporated herein by reference.

TECHNICAL FIELD

The present invention relates to a vehicle, an in-vehicle device, and a management method.

BACKGROUND ART

In the transportation field, in-vehicle devices configured to perform unlock using an electronic key are widely used in recent years. An electronic key is generally used in an expensive four-wheeled vehicle, and has many advantages as compared to a physical key or an FOB key. For example, a user can unlock a door of a vehicle by wireless communication at night without searching for a keyhole, unlike a physical key. Also, for example, a user can unlock a door of a vehicle only by carrying a communication terminal such as a smartphone in which an electronic key is recorded without holding a special device, unlike a physical key or an FOB key.

To enable unlock of a vehicle by an electronic key, the vehicle needs to receive and store a secret code or a secret algorithm configured to collate (confirm) an electronic key issued to a communication terminal. To prevent information used to collate the electronic key from illicitly being registered in the vehicle, the vehicle that permits access by the electronic key includes a communication unit capable of performing communication via a wide area wireless communication network such as a portable communication network to receive, from an external server, the secret code or a secret algorithm configured to permit unlock by the electronic key.

CITATION LIST

Patent Literature

PTL 1: WO 2013/099964

SUMMARY OF INVENTION

Technical Problem

A communication unit configured to use a portable communication network is expensive and needs a maintenance cost with a continuous contract, and this may increase the manufacturing cost or running cost of the vehicle. For this reason, penetration of an in-vehicle device using an electronic key to two-wheeled vehicles, more particularly, inexpensive two-wheeled vehicles has delayed.

However, when information such as a secret code or a secret algorithm necessary for unlock by an electronic key is transmitted (registered) from a communication terminal to a vehicle by short distance wireless communication, the communication unit configured to use a wide area wireless communication network need not be mounted in the vehicle, and the problem of cost can be solved.

However, if registration of the information necessary for unlock of the vehicle from the communication terminal to the vehicle is enabled, a communication terminal of a third party pretending to be the vehicle owner may transmit the information necessary for unlock by the electronic key to the vehicle side, and the vehicle may be hacked, increasing the security risk.

It is an object of the present invention to provide a technique for safely managing an electronic key of a vehicle by a communication terminal.

Solution to Problem

According to the present invention, there is provided a vehicle configured to cancel restriction of at least one function, which includes restriction of a function enabling an actuation of a power unit of the vehicle, by unlock of a first key, characterized by comprising: reception means for receiving a registration request of a second key that is an electronic key from a communication terminal by short distance wireless communication; determination means for determining, on condition that the vehicle is unlocked by the first key, whether to accept the registration request received by the reception means; and registration means for authenticating the second key concerning the registration request in a case where the determination means determines to accept the registration request and registering the authenticated second key.

Advantageous Effects of Invention

According to the present invention, it is possible to safely manage an electronic key of a vehicle by a communication terminal.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 5 is a sequence chart showing an example of electronic key registration processing of an electronic key management system 100 according to the first embodiment;

DESCRIPTION OF EMBODIMENTS

Embodiments of the present invention will now be described with reference to the accompanying drawings.

First Embodiment

This embodiment provides a system that allows the user of a vehicle to register the electronic key of the vehicle via a communication terminal held by the user. This system provides a mechanism configured to cause a communication terminal to safely manage the electronic key of a vehicle that does not include a wide area wireless communication module.

Figure 1:
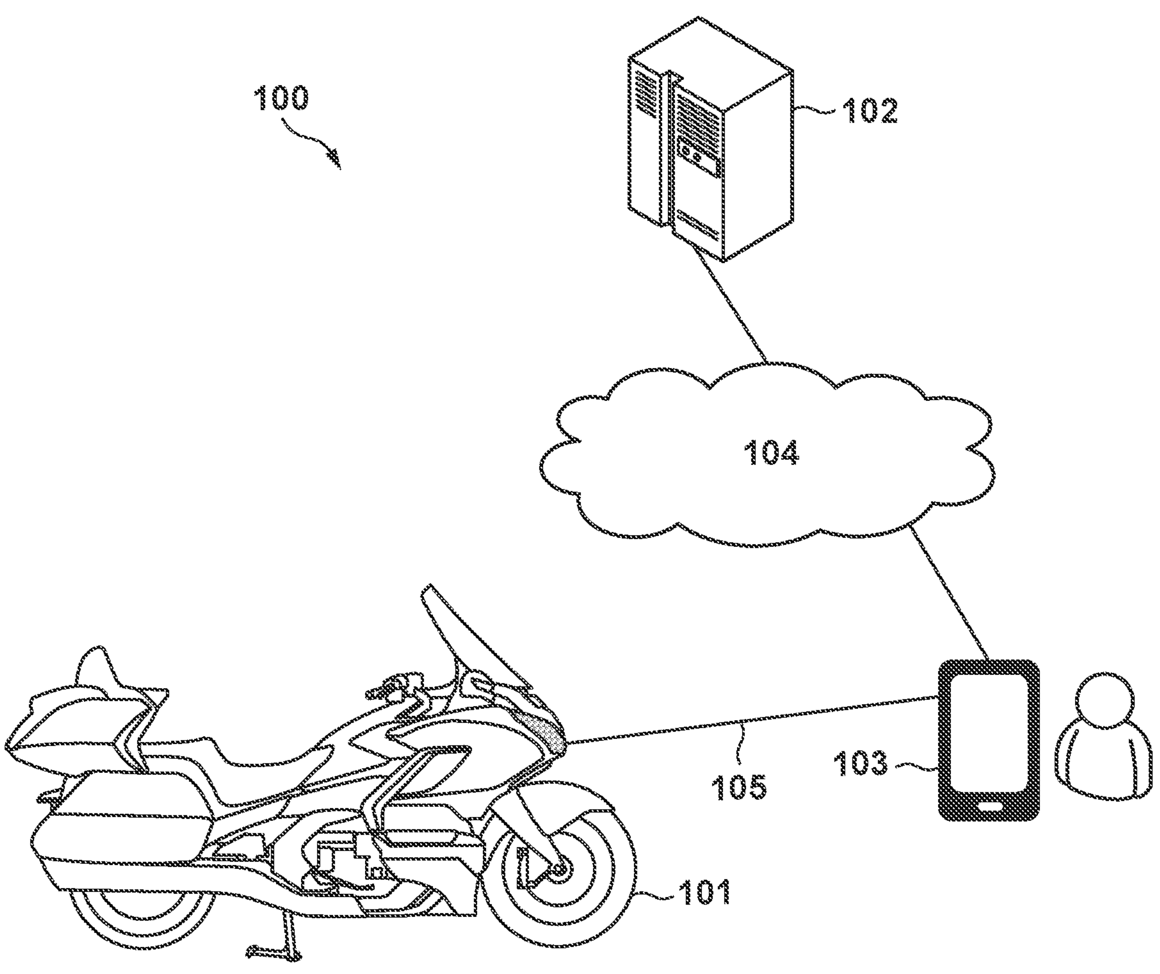
FIG. 1 is a view of an electronic key management system 100 according to the embodiment.

An electronic key management system according to this embodiment will be described with reference to FIG. 1. An electronic key management system 100 includes a vehicle 101, an electronic key server 102, and a communication terminal 103. The vehicle 101 and the communication terminal 103 are communicably connected via short distance wireless communication 105, and the communication terminal 103 and the electronic key server 102 are communicably connected via a network 104.

The vehicle 101 communicates with the communication terminal 103 and registers the electronic key of the vehicle 101 as will be described later to enable access to the vehicle 101. In an example, the vehicle 101 is a straddle type vehicle such as a motorcycle.

The communication terminal 103 can communicate with the electronic key server 102 via the network 104 and transmit/receive the electronic key of the vehicle 101 or information configured to enable unlock by the electronic key, such as or the parameters of a secret code or a secret algorithm. Also, the communication terminal 103 can communicate with the vehicle 101 via the short distance wireless communication 105 and execute electronic key authentication to be described later.

As an example, the communication terminal 103 is a terminal such as a smartphone held by the user of the electronic key management system. The electronic key server 102 communicates with the communication terminal 103 via the network 104.

The short distance wireless communication 105 may be short distance wireless communication including at least one of Bluetooth, BLE (Bluetooth Low-Energy), NFC (Near Field Communication), and UWB (Ultra-Wide Band communication). In an example, the short distance wireless communication 105 includes a wireless LAN network, infrared communication, or visible light communication.

The network 104 includes at least one of a cellular communication network and a wireless LAN network. Also, the network 104 may include a plurality of different networks including at least one of a wireless network and a wired network.

<Whole Vehicle>

Figure 2:
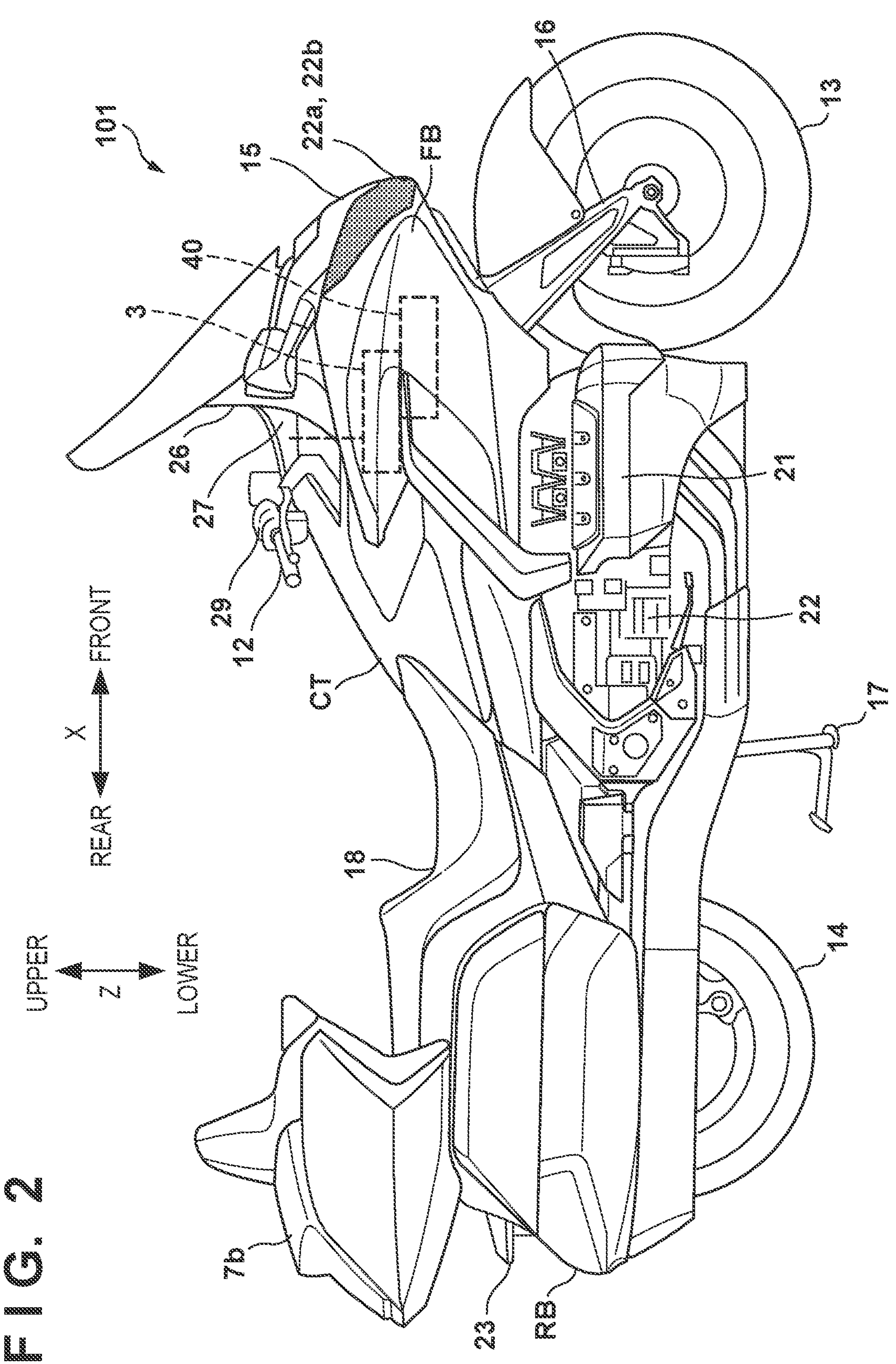
FIG. 2 is a view showing the hardware configuration of a vehicle 101 according to the embodiment.

As shown in FIG. 2, the vehicle 101 includes a front wheel 13 that is a steerable wheel, and a rear wheel 14 that is a drivable wheel. The front wheel 13 is supported by a front fork 16, and can be steered by a bar handle 12. The rear wheel 14 is supported by a swing unit (not shown), and can be driven by a reciprocal engine (an internal combustion engine, which will simply be referred to as an engine hereinafter) 21. The swing unit integrally includes the engine 21, and, for example, a V-belt type continuously variable transmission 22.

Steering system components including the bar handle 12, the front fork 16, and the front wheel 13 are steerably supported at the front end portion of a vehicle body frame (not shown). The swing unit and the rear wheel 14 are supported at the lower rear portion of the vehicle body frame so as to be swingable in the vertical direction. A side stand 17 configured to support the vehicle body in a standing posture tilting to the left side is storably provided on the lower left side of the vehicle body frame. The periphery of the vehicle body frame is covered with a vehicle body cover 15.

The vehicle 101 includes a front body FB and a rear body RB connected on the rear side. A head lamp 22*a* and a front turn signal 22*b* are arranged on the upper front portion of the front body FB. A rear combination lamp 23 including a tail lamp, a brake lamp, and a rear turn signal is arranged on the rear portion of the rear body RB. A seat 18 on which an occupant sits is supported on the rear body RB. A fuel lid configured to open/close a refueling port arrangement space is provided on the upper surface of a center tunnel CT.

The seat 18 pivots in the vertical direction with respect to, for example, a hinge shaft arranged at the front end portion as the center to open/close the upper portion of the rear body RB. An article storage portion (not shown) is arranged on the lower side of the seat 18. In a closed state in which the seat 18 closes the upper portion of the rear body RB, the occupant can sit on the seat 18. In an open state in which the seat 18 opens the upper portion of the rear body RB, it is possible to access the article storage portion on the lower side of the seat 18.

A meter panel 26 is arranged on the upper portion of the front body FB. A handle lock module 27 is stored inside the front body FB. The handle lock module 27 integrally includes a handle lock mechanism that is a main body portion, the communication unit of a smart control unit to be described later, and a main switch knob that is the main power switch of the vehicle 101.

In a main switch, a main switch knob serving as an operation unit is arranged on an inner panel on the side (rear side) of a step floor of the front body FB. A pivotal operation of the main switch knob is enabled or validated in a state in which ID authentication of a smart key (remote key) to be described later is done. By the pivotal operation of the main switch knob, the main switch is turned on. When the main switch is turned on, power is supplied to a control device 40 to be described later to enable start of the engine 21, and also enable unlock of the electromagnetic lock (an electromagnetic lock device to be operated by a solenoid) an opening/closing body such as the seat 18 or a fuel lid. The main switch knob also serves as an operation element configured to lock or unlock a handle lock mechanism.

<Smart Key System>

As shown in FIG. 2, the vehicle 101 includes a smart key system configured to enable lock and unlock of each unit of the vehicle.

The smart key system performs two-way communication between a smart key (a communication terminal or a FOB key) held by the driver and a smart control unit (an in-vehicle device or an SCU) 3 mounted in the vehicle body of the vehicle 101, thereby performing ID authentication of the smart key. If ID authentication of the smart key is performed, the smart key system enables start of the engine 21 or unlock of each unit of the vehicle.

The start of the engine 21 is done by gripping a brake lever on the right side of the bar handle 12 and pressing a starter switch when the main switch is ON. When the starter switch is pressed, the engine start control unit of the control device 40 drives a starter motor attached to the engine 21 and controls ignition and fuel injection, thereby starting the engine 21. The ON operation of the main switch knob (a pivotal operation to an ON position) is enabled or validated (unlock state) by ID authentication of the smart key, and disabled or invalidated (lock state) when communication between the smart key and the vehicle 101 ends because of separation of the smart key or the like. Units to be unlocked or locked by turning on/off the main switch include, for example, the handle lock mechanism, the lock of the seat 18, the lock of a trunk case 7*b*, and the lock of the fuel lid.

When the smart key whose power supply is ON enters a predetermined authentication area, the smart key system performs two-way communication between the smart key and the smart control unit 3 using, for example, an operation such as pressing of the main switch knob or pressing of an operation button of the smart key as a trigger. By the two-way communication, the smart control unit 3 reads the ID information of the smart key and authenticates the smart key. The authentication area is, for example, a range of a radius of about 2 m with respect to the vehicle body center as the base point. When the smart key is authenticated, the ON operation of the main switch knob is enabled, the handle lock is unlocked, and unlock of each unit of the vehicle is enabled.

The smart key system stops the communication between the smart key and the smart control unit 3 when the smart key leaves the authentication area, or the smart key is powered off. The smart key system stops the communication between the smart key and the smart control unit 3 by the OFF operation of the main switch knob (a pivotal operation to an OFF position) as well.

The main switch knob has the OFF position where the main switch is turned off, the ON position where the main switch is turned on, a seat/fuel unlock position located between the OFF position and the ON position, where an opening operation of the seat 18 and the fuel lid is enabled, and a lock position where the main switch is made to pivot to the opposite side from the OFF position to the ON position while being pressed to set the locks of the units of the vehicle including the handle lock in the lock state. When the main switch knob is located at the seat/fuel unlock position, an operation of a seat/fuel unlock switch adjacent to the main switch knob is enabled or validated.

A communication unit configured to perform communication with the smart key, the control device 40, the lock devices of the units of the vehicle, a notification driving device configured to operate various kinds of notification means in accordance with the operation of the smart key system, and the like are connected to the smart control unit 3. For example, the communication unit may be arranged integrally with the handle lock module 27.

When a smart key system performs lock or unlock of the lock device of each unit of the vehicle, the notification driving device executes at least one of a visual sign of, for example, blinking a hazard lamp and an auditory sign of generating an electronic sound (answer back). This allows the user to know that the lock device of each unit of the vehicle is locked or unlocked.

The control device 40 is, for example, an integrated ECU (Electric Control Unit), and functions as the control unit of an entire control system. An engine start signal from a starter switch 29 is input to the control device 40 via the smart control unit 3.

Note that each means provided in the control device 40 is implemented by, for example, executing a program, but may be configured as hardware including one or more electric components. In addition, the control device 40 itself may be formed as a plurality of divided units, or may be a means implemented by executing a program.

Note that in this embodiment, a description will be made assuming that the smart control unit 3 can perform only communication by the short distance wireless communication 105.

Figure 3:
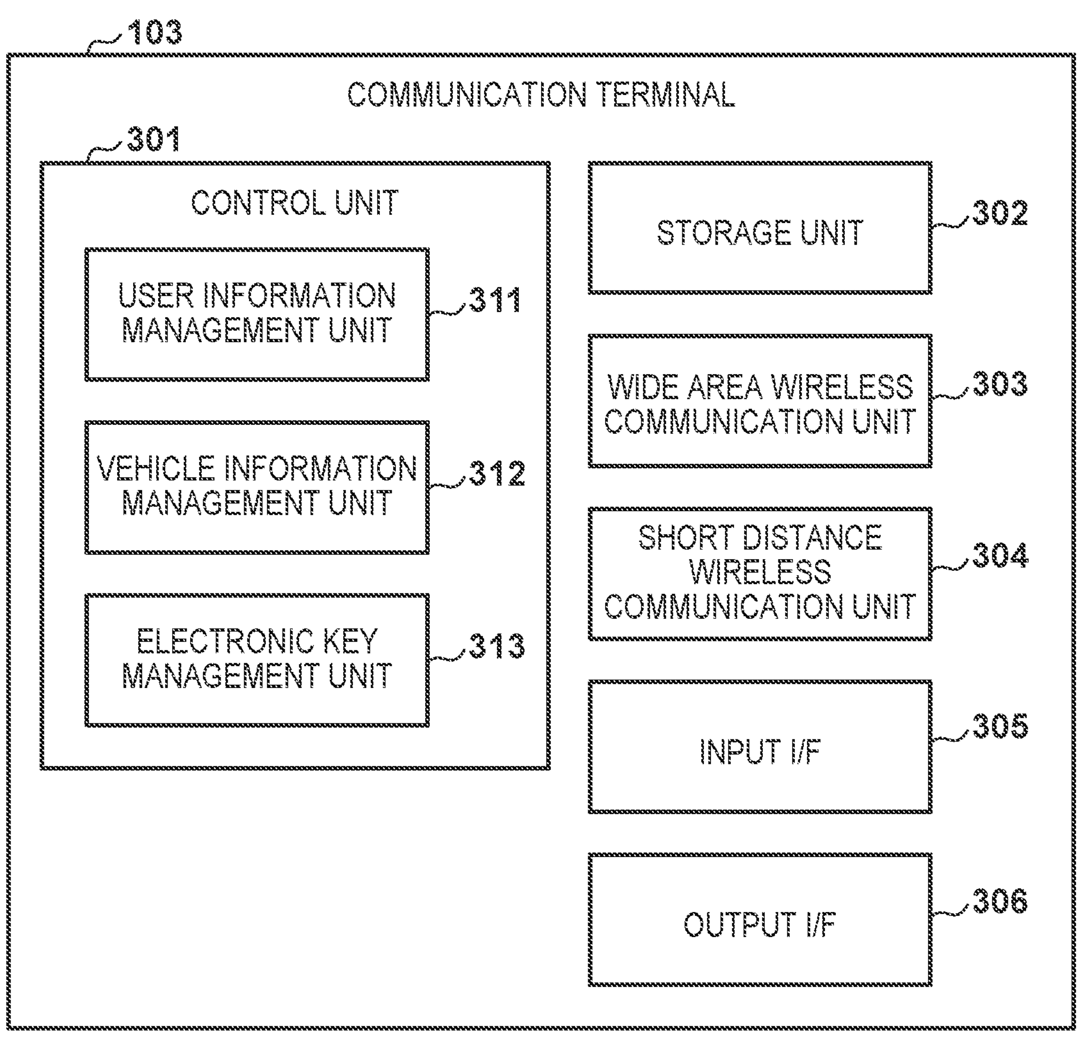
FIG. 3 is a block diagram of a communication terminal 103 according to the embodiment.

The block diagram of the communication terminal 103 will be described next with reference to FIG. 3.

The communication terminal 103 includes a control unit 301, a storage unit 302, a wide area wireless communication unit 303, a short distance wireless communication unit 304, an input interface (I/F) 305, and an output I/F 306, which are communicably connected.

The control unit 301 includes a CPU and a RAM (Random Access Memory), and executes various kinds of programs stored in the storage unit 302, thereby executing control for registering an electronic key in the vehicle 101. Also, the control unit 301 executes various kinds of programs, thereby functioning as a user information management unit 311, a vehicle information management unit 312, and an electronic key management unit 313.

The user information management unit 311 manages the information of the user of the communication terminal 103, and performs transmission/reception to/from the electronic key server 102. In an example, the user information management unit 311 manages the information of the communication terminal 103 as well. The vehicle information management unit 312 manages the information of at least one of the model, the number plate, and the position of the vehicle 101 to be used by the user. The electronic key management unit 313 registers, in the vehicle 101, an electronic key received from the electronic key server 102.

The storage unit 302 stores data concerning the user information management unit 311, the vehicle information management unit 312, and the electronic key management unit 313. In an example, the storage unit 302 includes at least one of flash memories such as an HDD (Hard Disk Drive), an SSD (Solid State Drive), and an eMMC (embedded Multi Media Card).

The wide area wireless communication unit 303 includes a communication circuit capable of performing communication via the network 104. In an example, the wide area wireless communication unit 303 is a wireless communication circuit capable of performing communication complying with a cellular communication standard such as LTE or LTE-A. The short distance wireless communication unit 304 includes a communication circuit capable of performing communication via the short distance wireless communication 105.

The input I/F 305 is a user interface (UI) including a button or a touch panel configured to accept a user operation, and the output I/F 306 is a UI including a liquid crystal display or a loudspeaker. In an example, the input unit 305 and the output unit 306 can be implemented integrally as a touch panel display.

Figure 4:
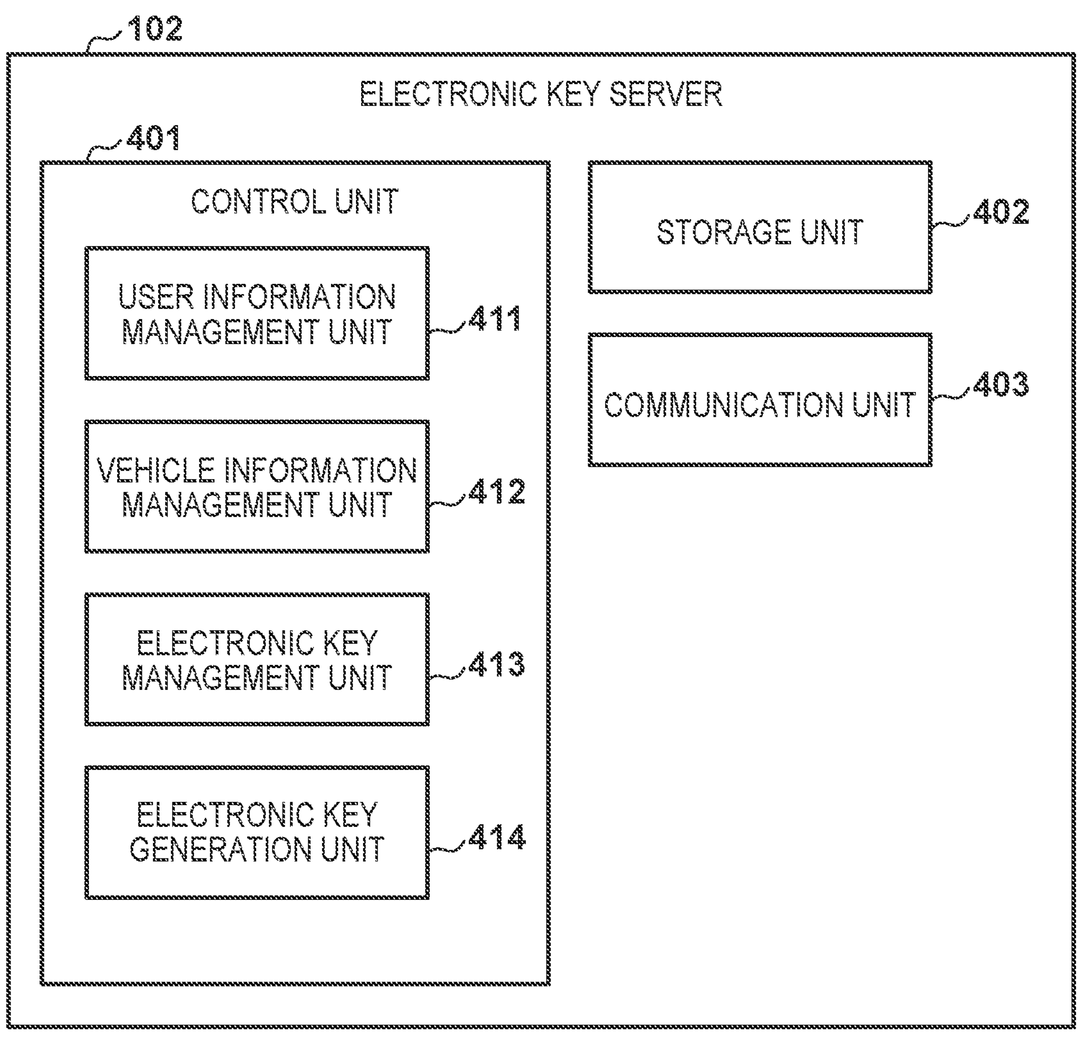
FIG. 4 is a block diagram of an electronic key server 102 according to the embodiment.

The block diagram of the electronic key server 102 will be described next with reference to FIG. 4. The electronic key server 102 includes a control unit 401, a storage unit 402, and a communication unit 403.

The control unit 401 includes a CPU and a RAM (Random Access Memory), and executes various kinds of programs stored in the storage unit 402, thereby executing control for registering an electronic key in the vehicle 101. Also, the control unit 401 executes various kinds of programs, thereby functioning as a user information management unit 411, a vehicle information management unit 412, and an electronic key generation unit 414.

The user information management unit 411 receives the information of the user from the communication terminal 103, and manages the information of the user of the electronic key management system. In an example, the user information management unit 411 may manage the information of the communication terminal 103. The vehicle information management unit 412 manages the information of at least one of the model, the frame number (serial number), the number plate, and the position of the vehicle 101 owned by the user of the electronic key management system. The electronic key generation unit 414 generates an electronic key in accordance with a request from the communication terminal 103, and transmits the generated electronic key to the communication terminal 103.

The storage unit 402 stores data concerning the user information management unit 411, the vehicle information management unit 412, and the electronic key generation unit 414. In an example, the storage unit 402 includes at least one of flash memories such as an HDD (Hard Disk Drive), an SSD (Solid State Drive), a UFS (Universal Flash Storage), and an eMMC (embedded Multi Media Card).

The communication unit 403 includes a communication circuit capable of performing communication via the network 104. In an example, the communication unit 403 is a wide area wireless communication circuit capable of performing communication complying with a cellular communication standard such as LTE or LTE-A.

Processing of the electronic key management system 100, in which the user newly creates an account and registers an electronic key in the vehicle, will be described next with reference to FIG. 5. Note that the description will be made assuming that short distance wireless communication is used as the communication between the communication terminal 103 and the vehicle 101, and wide area wireless communication is used as the communication between the communication terminal 103 and the electronic key server 102.

First, in step S501, the communication terminal 103 establishes connection to the electronic key server 102, and provides user information and information (vehicle information) concerning the vehicle whose electronic key is to be managed. Next, the electronic key server 102 stores the provided user information in the user information management unit 411, and the vehicle information in the vehicle information management unit 412, and in step S502, issues a user account based on the user information. In the subsequent processing, communication is performed using the user account. For example, the communication terminal 103 transmits vehicle information including at least one of information concerning the number plate of the registered vehicle and information concerning the frame number (serial number) to the electronic key server 102 in association with the user account. In an example, the communication terminal 103 also transmits information concerning the owner of the vehicle to the electronic key server 102.

Next, in step S503, the communication terminal 103 requests issuance of an electronic key corresponding to the transmitted user information and vehicle information. In an example, the electronic key server 102 receives, from the communication terminal 103, an electronic key issuance request signal including identifiers capable of specifying the user information and the vehicle information.

Upon receiving the electronic key issuance request signal, the electronic key server 102 generates an electronic key corresponding to the user information and the vehicle information by the electronic key generation unit 414, and in step S504, temporarily issues the electronic key to the communication terminal 103. In step S504, the electronic key server 102 transmits, to the communication terminal 103, the electronic key to be used by the communication terminal 103 and information (authentication information) used to authenticate the electronic key to be registered in the vehicle 101, but restricts the functions of the electronic key management unit 313 of the communication terminal 103 such that unlock cannot be performed by the electronic key used by the communication terminal 103. Alternatively, in step S504, the electronic key server 102 may transmit only the electronic key to be registered in the vehicle 101, and after the registration in the vehicle 101 is completed, transmit the electronic key to be used by the communication terminal 103.

Next, in step S505, the communication terminal 103 writes the authentication information of the electronic key in the vehicle 101. Here, to store only authentication information from the reliable communication terminal 103 such as the communication terminal of the owner of the vehicle 101 in the electronic key management unit, the vehicle 101 is set in an electronic key write mode.

In an example, if the vehicle 101 is set in the electronic key write mode by an FOB key, the vehicle 101 stores, in a smart ECU, the authentication information transmitted from the communication terminal 103. That is, the vehicle 101 is set in the electronic key write mode by transmitting an unlock signal to the vehicle 101 by the FOB key. In another example, the vehicle 101 can be set in the electronic key write mode by setting the main switch knob of the vehicle 101. In still another example, the vehicle 101 may be set in the electronic key write mode by a physical key.

Note that in step S505, even in the electronic key write mode, if the authentication information is verified, and vehicle information included in the authentication information is different from that of the vehicle 101, the vehicle 101 need not store the electronic key in the electronic key management unit.

Upon determining in step S506 that the authentication information is stored, that is, upon determining that the registration of the electronic key is completed, in step S507, the communication terminal 103 notifies the electronic key server 102 of the completion of the write. Upon receiving the write completion notification, the electronic key server 102 stores the user information, the vehicle information, and the electronic key in association with each other and in step S508, transmits an activation signal for the electronic key to the communication terminal 103. Upon receiving the activation signal, the communication terminal 103 can transmit, to the vehicle 101, an unlock signal or the like generated using the electronic key.

A method of accessing the vehicle 101 from the communication terminal 103 using the electronic key will be described next. Upon determining, based on the radio wave intensity of a beacon signal that the communication terminal 103 periodically transmits from the short distance wireless communication unit 304, that the communication terminal 103 is close to the vehicle 101, the SCU 3 authenticates the electronic key of the communication terminal 103. If the authentication of the electronic key succeeds, the vehicle 101 can perform an operation of the main switch knob to, for example, start the engine, like the smart key. Alternatively, the communication unit of the SCU 3 may periodically transmit a beacon signal, and the communication terminal 103 that has detected the beacon signal may transmit an electronic key authentication request.

Figure 7:
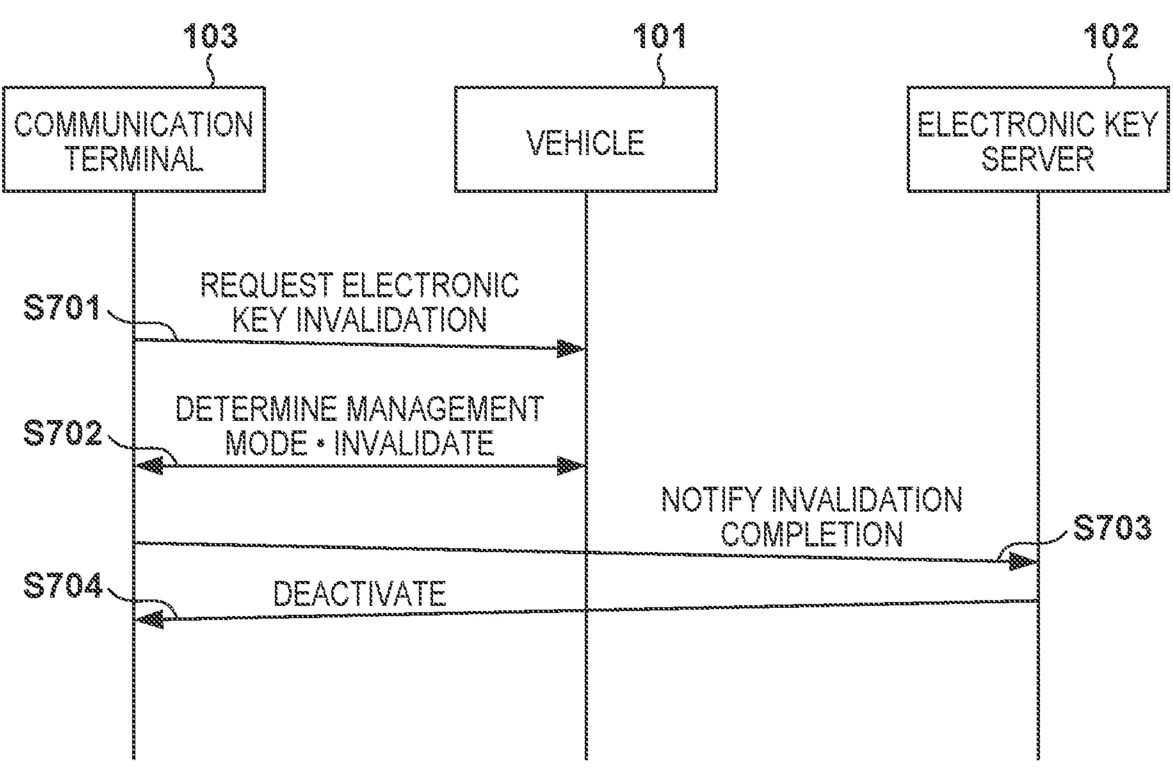
FIG. 7 is a sequence chart showing an example of electronic key invalidation processing of the electronic key management system 100 according to the first embodiment.

Processing of the electronic key management system 100, in which the user invalidates, via the communication terminal 103, the electronic key registered in the vehicle 101, will be described next with reference to FIG. 7. Note that the description will be made assuming that the communication terminal 103 has already created the user account and registered the electronic key in the vehicle 101, as shown in FIG. 5.

First, in step S701, the communication terminal 103 transmits an electronic key invalidation request to the vehicle 101. The invalidation request can include at least one of the identifier of the vehicle 101 and the identifier of the communication terminal 103, and the identifier of the electronic key to be invalidated.

Next, the communication terminal 103 and the vehicle 101 determine whether the electronic key invalidation request is a request from a reliable communication terminal by the same method as described with reference to FIG. 5. Upon determining, as the result of verification, that the vehicle 101 is in an electronic key management mode and accepts the electronic key invalidation request received from the communication terminal 103, the vehicle 101 invalidates the designated electronic key from a valid electronic key list registered in the electronic key management unit, and when the invalidation is completed, makes a notification to the communication terminal 103.

Next, upon receiving the notification representing that the electronic key invalidation is completed, the communication terminal 103 advances the process to step S703, and notifies the electronic key server 102 of the electronic key invalidation completion notification. Upon receiving the invalidation completion notification, the electronic key server 102 updates information concerning the electronic key linked with at least one of the user information management unit 411 and the vehicle information management unit 412 and transmits a deactivation signal to the communication terminal 103. Upon receiving the deactivation signal, the communication terminal 103 updates the information in the electronic key management unit 313, and invalidates it not to use the invalidated electronic key.

Figure 9:
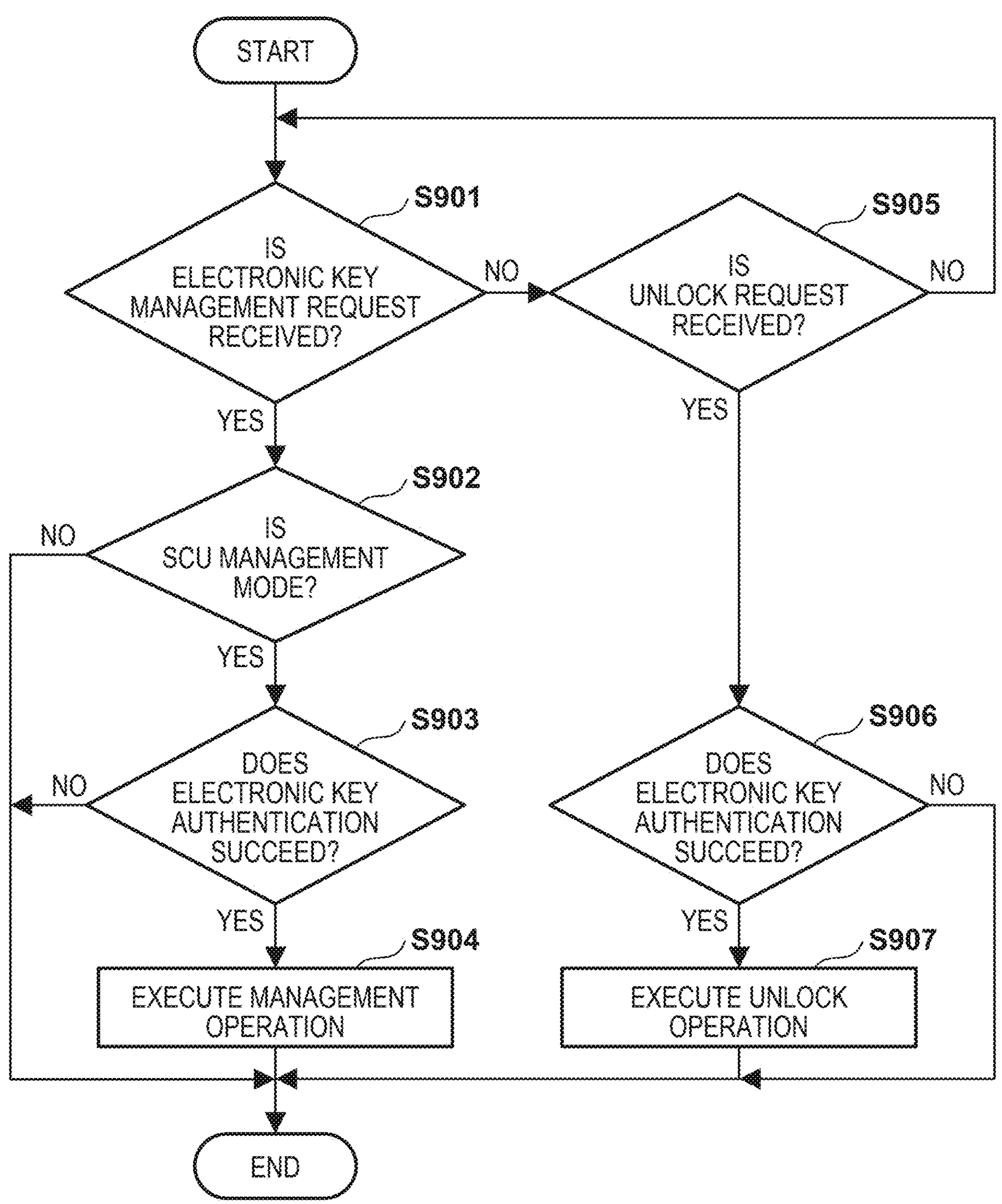
FIG. 9 is a flowchart showing an example of processing of the SCU according to the embodiment.

An example of processing executed by the SCU 3 (in-vehicle device) of the vehicle 101 will be described next with reference to FIG. 9. Note that the processing shown in FIG. 9 is implemented when the CPU (not shown) expands a program stored in the storage unit (not shown) of the SCU 3 on a RAM (not shown) and executes it.

First, in step S901, the SCU 3 determines whether an electronic key management request is received from the communication terminal 103. The management request includes at least one of an electronic key registration request, an invalidation request, and a transmission request of information concerning the electronic key. Upon determining that the electronic key management request is received (YES in step S901), the SCU 3 advances the process to step S902. Upon determining that the management request is not received (NO in step S901), the SCU 3 advances the process to step S905.

In step S902, the SCU 3 determines whether the SCU 3 is in an electronic key management mode. As described above, if authentication of the FOB key succeeds, or authentication of a predetermined electronic key succeeds within a predetermined time from the time of reception of the electronic key management request or within a predetermined time before reception of the management request, it is determined that the SCU 3 is in the electronic key management mode. Upon determining that the SCU 3 is in the electronic key management mode (YES in step S902), the SCU 3 advances the process to step S903. Upon determining that the SCU 3 is not in the electronic key management mode (NO in step S902), the SCU 3 ends the processing shown in FIG. 9.

In step S903, the SCU 3 authenticates the received electronic key. If the authentication of the electronic key succeeds (YES in step S903), the SCU 3 advances the process to step S904 to execute the requested electronic key management operation. If the authentication of the electronic key fails (NO in step S903), the SCU 3 ends the processing shown in FIG. 9.

In step S905, the SCU 3 determines whether an unlock request is received from the communication terminal 103. Upon determining that the unlock request is received (YES in step S905), the SCU 3 advances the process to S906. Upon determining that the unlock request is not received (NO in step S905), the SCU 3 returns the process to S901.

In step S906, the SCU 3 authenticates the received electronic key. If the authentication of the electronic key succeeds (YES in step S906), the SCU 3 advances the process to step S907 to execute the requested unlock operation.

As described above, according to the first embodiment, it is possible to manage, by the communication terminal, the electronic key registered in the vehicle 101.

Second Embodiment

In the first embodiment, processing used by the communication terminal 103 with which the vehicle 101 communicates has been described. In the second embodiment, processing of registering an electronic key in a vehicle, which is used by a communication terminal different from a communication terminal with which the vehicle communicates, will be described. Note that a description of the same configuration or processing as in the first embodiment will be omitted.

Figure 8:
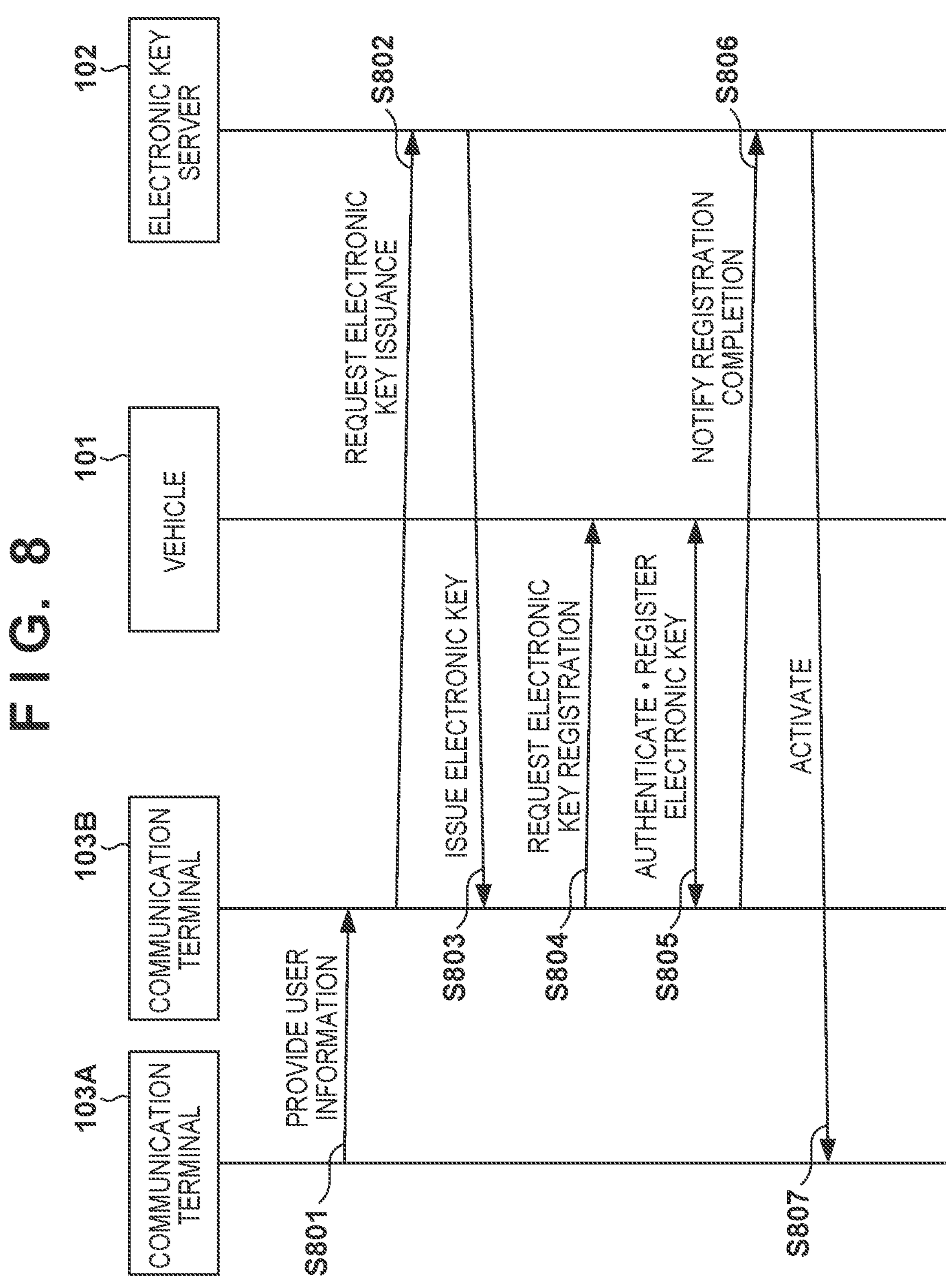
FIG. 8 is a sequence chart showing an example of electronic key registration processing of an electronic key management system 100 according to the second embodiment.

FIG. 8 is a sequence chart showing an example of processing of a communication terminal 103B to register, in a vehicle 101, an electronic key to be used by a communication terminal 103A. Assume that the communication terminals 103A and 103B are operated by different users, and account issuance in steps S501 and S502 of FIG. 5 is performed for each user.

First, in step S801, the communication terminal 103A provides user information to the communication terminal 103B. In step S801, the user information may be transmitted via the Internet, or may be transmitted by a telephone, a conversation of the users, or the like.

Next, in step S802, the communication terminal 103B transmits an electronic key issuance request to an electronic key server 102. The electronic key issuance request transmitted in step S802 includes the identifier of the communication terminal 103A, the identifier of the communication terminal 103B, and the identifier of the vehicle 101.

Upon receiving the electronic key issuance request, in step S803, the electronic key server 102 determines, based on the identifier of the communication terminal 103B and the identifier of the vehicle 101, whether to issue an electronic key. Upon determining to issue an electronic key, the electronic key server 102 generates an electronic key and transmits it to the communication terminal 103B. Next, in step S804, the communication terminal 103B transmits an electronic key registration request to the vehicle 101. The electronic key is written.

Note that in the electronic key registration request executed in step S804, the vehicle 101 may verify the communication terminal 103B, as in step S505. Next, in step S805, authentication of the electronic key is performed between the communication terminal 103B and the vehicle 101. If the vehicle 101 judges to register the electronic key, the vehicle 101 stores the received electronic key in an electronic key management unit.

When the write is completed, in step S806, the communication terminal 103B notifies the electronic key server 102 of the completion. Upon receiving the write completion notification, in step S807, the electronic key server 102 transmits an activation signal to the communication terminal 103A to permit the communication terminal 103A to transmit the electronic key to the vehicle 101. Note that the electronic key may be transmitted from the electronic key server 102 to the communication terminal 103A at the timing of step S803 or S807.

As described above, according to this embodiment, the communication terminal can manage the electronic key to be used by another communication terminal. This allows the owner of the vehicle to lend the electronic key to another person.

Note that in an example, the electronic key may include information for designating a period when unlock is possible, and in a time zone other than the period, the vehicle need not authenticate the electronic key, or need not cancel function restriction even if authentication is performed.

Third Embodiment

In the third embodiment, a vehicle 101 has a structure configured to allow an SCU 3 to correctly detect a communication terminal 103 by preventing a user from being located on a line between the communication terminal 103 and the communication unit of the SCU 3. Note that a description of the same configuration or processing as in the first or second embodiment will be omitted.

If the user exists between the communication unit and the communication terminal 103, the attenuation of a radio wave by the body or cloth of the user becomes large, and the SCU 3 may make a wrong estimation of the distance based on the radio wave intensity. In this case, even if the user who is holding the communication terminal 103 exists in the vicinity, the SCU 3 may erroneously recognize that the communication terminal 103 is far away and may not perform authentication. Also, if the attenuation of the radio wave abruptly changes during traveling, the SCU 3 may judge that the communication terminal 103 is dropped, and may erroneously execute a drop detection function even if the communication terminal 103 is not dropped.

To avoid such a problem and cause the SCU 3 to correctly estimate the distance from the communication terminal 103, the vehicle 101 according to this embodiment prevents the riding position of the user from being included on the line (LOS) that connects the SCU antenna and the smartphone.

Figure 6:
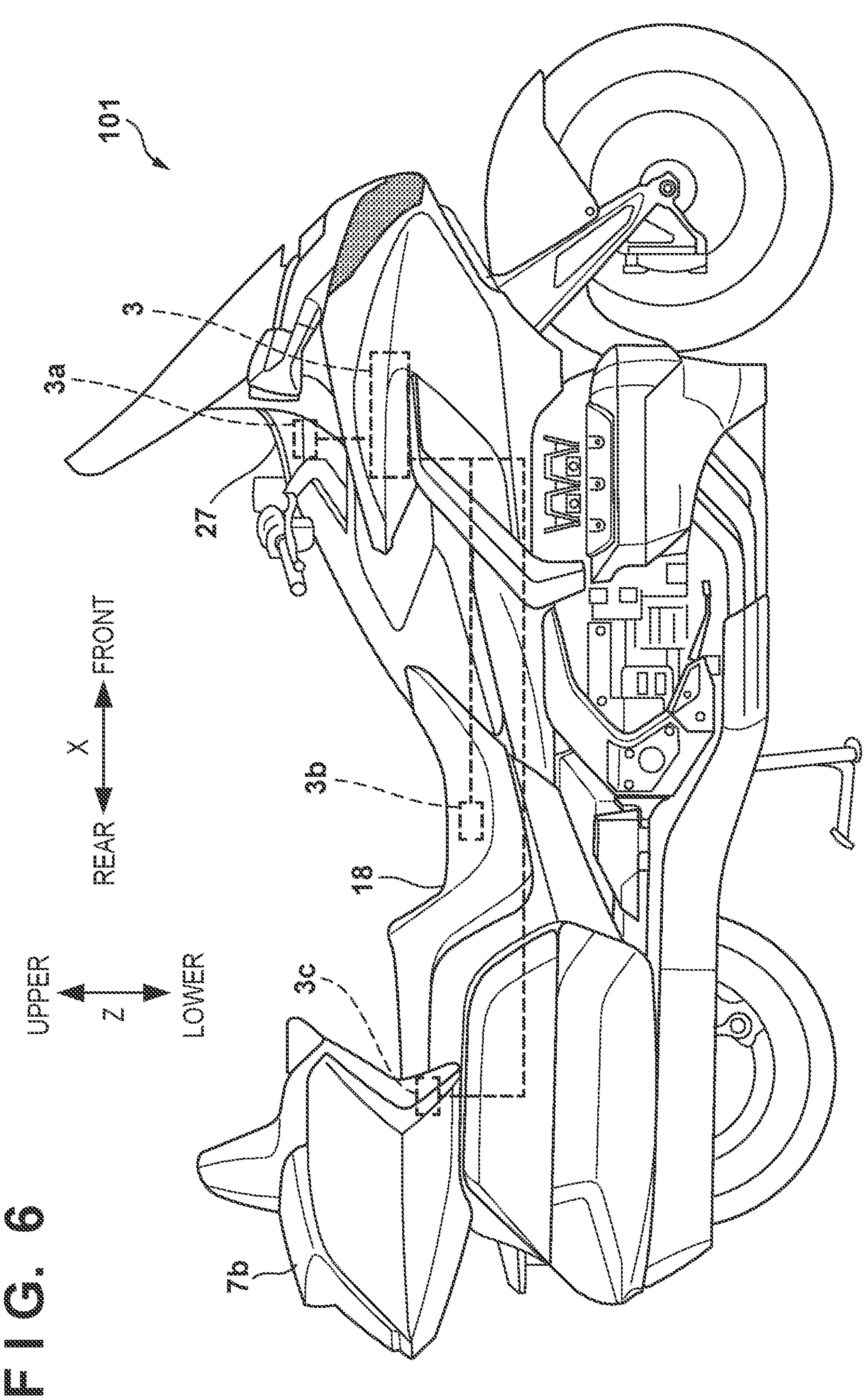
FIG. 6 is a view showing an example of the arrangement of the communication unit of an SCU 3 according to the embodiment.

In an example, if the communication unit of the SCU 3 is arranged in a handle lock module 27, a space (holder) 3*a* in which the communication terminal 103 is installed may be arranged near the handle lock module 27. That is, if a receiving unit is arranged on the front side of the riding position of the user, the holder 3*a* is arranged on the front side of the riding position of the user. In another example, if the communication terminal of the SCU 3 is arranged in the lower portion of a seat 18, a space (holder) 3*b* in which the communication terminal 103 is installed may be arranged in the lower portion of the seat 18. In still another example, if the communication terminal of the SCU 3 is arranged near a trunk case 7*b*, a space (holder) 3*c* in which the communication terminal 103 is installed may be arranged near the trunk case 7*b*. Hence, since the attenuation of the radio wave never becomes large while the user is arranging the communication terminal 103 in the holder, the SCU 3 can authenticate the communication terminal 103. Note that although the SCU 3 is shown in a front body FB in FIG. 6, the arrangement of the SCU 3 may be changed depending on the place to arrange the communication unit. Note that in this embodiment, the handle lock module 27, the seat 18, and the trunk case 7*b* have been described as examples. However, the communication unit and the holder may be arranged in a side case. In addition, the communication unit and the holder may be arranged in any places as long as the user is not located on the line that connects these. For example, the communication unit may be arranged in the trunk case 7*b*, and the holder may be arranged in the side case.

Also, in another example, the SCU 3 may be connected to a plurality of communication units. Hence, for example, if the user stores the communication terminal 103 in a chest pocket, a communication unit arranged in the handle lock module 27 can perform authentication. If the user puts the communication terminal 103 in a pocket of pants, a communication unit arranged in the seat 18 can perform authentication. That is, to prevent the riding position of the user from being included on the line that connects the communication terminal 103 and any communication unit, the plurality of communication units are arranged across the riding position. In this case, no holder need be arranged near the communication units.

As described above, in this embodiment, the vehicle 101 prevents the user from being located on the line between the communication terminal 103 and the communication unit of the SCU 3, thereby allowing the SCU 3 to correctly detect the communication terminal 103.

Other Embodiments

In this embodiment, the description has been made assuming that the electronic key server 102 issues an electronic key. However, a module corresponding to the electronic key issuance unit of the electronic key server 102 may be provided in the communication terminal 103. Also, a function corresponding to the module may be implemented by a cloud service on the Internet.

In the first embodiment, the description has been made assuming that the electronic key registered in the vehicle 101 is invalidated by communication of the reliable communication terminal 103 with the vehicle 101. In an example, however, a mechanism configured to invalidate the electronic key without communication between the communication terminal 103 and the vehicle 101 may be provided. For example, the electronic key registered in the vehicle 101 may be invalidated by operating operation elements provided in the vehicle 101 in a specific order.

Summary of Embodiments

1. A vehicle (for example, vehicle 101) according to the above-described embodiment is a vehicle configured to cancel restriction of at least one function by unlock of a first key, comprising reception means (for example, SCU 3) for receiving a registration request of a second key that is an electronic key from a communication terminal (for example, communication terminal 103) by short distance wireless communication (for example, short distance wireless communication 105), determination means for determining (for example, SCU 3, S902), on condition that the vehicle is unlocked by the first key, whether to accept the registration request received by the reception means, and registration means for registering (for example, SCU 3, S904) the second key concerning the registration request if the determination means determines to accept the registration request.

It is therefore possible to safely manage the electronic key of the vehicle by the communication terminal.

2. The first key according to the above-described embodiment is a smart key.

It is therefore possible to safely manage the electronic key of the vehicle by the communication terminal and unlock of the smart key.

3. The reception means according to the above-described embodiment further receives an invalidation request of at least one registered second key from the communication terminal by the short distance wireless communication, and the determination means further determines, on condition that the vehicle is unlocked by the first key, whether to accept the invalidation request received by the reception means.

It is therefore possible to safely invalidate the electronic key of the vehicle by the communication terminal.

4. The reception means according to the above-described embodiment further receives a transmission request of information concerning at least one registered second key from the communication terminal by the short distance wireless communication, and the determination means further determines, on condition that the vehicle is unlocked by the first key, whether to accept the transmission request received by the reception means.

It is therefore possible to safely acquire the information concerning the electronic key of the vehicle by the communication terminal.

5. The registration request according to the above-described embodiment includes a parameter concerning a period during which the second key is valid, and even if the second key is registered in the vehicle, the second key does not cancel the restriction of the at least one function during a period different from the period.

It is therefore possible to set, by the communication terminal, the period during which the electronic key is valid and safely manage the electronic key of the vehicle.

6. The second key according to the above-described embodiment unlocks at least one of a main switch lock, a seat lock, a trunk case, and a side case provided in the vehicle.

It is therefore possible to safely manage, by the communication terminal, the electronic key capable of unlocking the main switch lock, the seat lock, the trunk case, and the side case of the vehicle.

7. The second key according to the above-described embodiment includes an identifier of a communication terminal different from the communication terminal.

Hence, the owner of the vehicle can lend the vehicle to a third party during a designated period.

8. The vehicle according to the above-described embodiment is a straddle type vehicle.

It is therefore possible to safely manage the electronic key of the straddle type vehicle by the communication terminal.

9. An in-vehicle device according to the above-described embodiment is an in-vehicle device of a vehicle configured to cancel restriction of at least one function by unlock of a first key, wherein a registration request of a second key that is an electronic key is received from a communication terminal by short distance wireless communication, it is determined, on condition that the vehicle is unlocked by the first key, whether to accept the received registration request, and the second key concerning the registration request is registered if it is determined to accept the registration request.

It is therefore possible to safely manage the electronic key of the vehicle by the communication terminal.

10. A management method of an electronic key according to the above-described embodiment comprises a first reception step of receiving, by an electronic key server, an issuance request of the electronic key from a communication terminal, a generation step of generating, by the electronic key server, the electronic key based on the issuance request, a transmission step of transmitting, by the electronic key server, the generated electronic key to the communication terminal, a second reception step of receiving, by a vehicle, a registration request to register the electronic key from the communication terminal, a determination step of determining, by the vehicle, on condition that the vehicle is unlocked by the first key, whether to accept the registration request, and a registration step of registering, by the vehicle, the second key concerning the registration request if it is determined, in the determination step, to accept the registration request.

It is therefore possible to safely manage the electronic key of the vehicle by the communication terminal.

The present invention is not limited to the above embodiments and various changes and modifications can be made within the spirit and scope of the present invention. Therefore, to apprise the public of the scope of the present invention, the following claims are made.

REFERENCE SIGNS LIST

100 . . . electronic key management system,
101 . . . vehicle,
102 . . . electronic key server,
103 . . . communication terminal,
104 . . . network,
105 . . . short distance wireless communication

What is claimed is:

1. A vehicle configured to cancel restriction of at least one function, which includes restriction of a function enabling an actuation of a power unit of the vehicle, by unlock of a first key which is a smart key held by the driver and a smart control unit mounted in the vehicle body of the vehicle, where the vehicle is unlocked using the first key, thereby performing authentication of the smart key, the vehicle performing:

receiving a registration request of a second key that is an electronic key different from the first key wherein the vehicle is communicably connected with a communication terminal by short distance wireless communication, determining whether to accept the received registration request based upon whether the vehicle is unlocked using the first key, authenticating the second key associated with the registration request in a case where it is determined to accept the registration request, and registering the authenticated second key in response to successful authentication of the second key, receiving an invalidation request of at least one registered second key from the communication terminal by the short distance wireless communication, and determining whether to accept the received invalidation request based upon whether the vehicle is unlocked using the first key.

2. The vehicle according to claim 1, further comprising:

receiving a transmission request of information concerning at least one registered second key from the communication terminal by the short distance wireless communication, and determining, on condition that the vehicle is unlocked by the first key, whether to accept the received transmission request.

3. The vehicle according to claim 1, wherein the registration request includes a parameter concerning a period during which the second key is valid, and even in a case where the second key is registered in the vehicle, the second key does not cancel the restriction of the at least one function during a period different from the period.

4. The vehicle according to claim 1 wherein the second key unlocks at least one of a main switch lock, a seat lock, a trunk case, and a side case provided in the vehicle.

5. The vehicle according to claim 1, wherein the second key includes an identifier of a communication terminal different from the communication terminal.

6. The vehicle according to claim 1, wherein the vehicle is a straddle type vehicle.

7. An in-vehicle device of a vehicle configured to cancel restriction of at least one function, which includes restriction of a function enabling an actuation of a power unit of the vehicle, by unlock of a first key which is a smart key held by the driver and a smart control unit mounted in the vehicle body of the vehicle, thereby performing authentication of the smart key, where the vehicle is unlocked using the first key, wherein the in-vehicle device performs:

receiving a registration request of a second key that is an electronic key different from the first key wherein the in-vehicle device is communicably connected with a communication terminal by short distance wireless communication, determining whether to accept the received registration request based upon whether the vehicle is unlocked using the first key, authenticating the second key associated with the registration request in a case where it is determined to accept the registration request, and registering the authenticated second key in response to successful authentication of the second key, receiving an invalidation request of at least one registered second key from the communication terminal by the short distance wireless communication, and determining whether to accept the received invalidation request based on whether the vehicle is unlocked using the first key.

8. A management method of an electronic key where a vehicle is unlocked using a first key, the method comprising:

a first reception step of receiving, by an electronic key server, an issuance request of the electronic key from a communication terminal;

a generation step of generating, by the electronic key server, the electronic key based on the issuance request;

a transmission step of transmitting, by the electronic key server, the generated electronic key to the communication terminal;

a second reception step of receiving, by the vehicle, a registration request to register the electronic key from the communication terminal;

a first determination step of determining, by the vehicle, whether to accept the registration request based on whether the vehicle is unlocked using the first key, where the first key is a smart key held by the driver and a smart control unit mounted in the vehicle body of the vehicle, thereby performing authentication of the smart key, which cancels restriction of a function enabling an actuation of a power unit of the vehicle;

a registration step of authenticating, by the vehicle, the electronic key, which is different from the first key, wherein the vehicle is communicably connected with the communication terminal by short distance wireless communication, associated with the registration request in a case where it is determined, in the first determination step, to accept the registration request, and registering the authenticated electronic key in response to successful authentication of the second key;

a third reception step of receiving an invalidation request of at least one registered second key from the communication terminal by the short distance wireless communication; and a second determination step of determining whether to accept the received invalidation request based upon whether the vehicle is unlocked using the first key.

9. A vehicle configured to cancel restriction of at least one function, which includes restriction of a function enabling an actuation of a power unit of the vehicle, by unlock of a first key which is a smart key held by the driver and a smart control unit mounted in the vehicle body of the vehicle, thereby performing authentication of the smart key, where the vehicle is unlocked using the first key, the vehicle performing:

receiving a registration request of a second key that is an electronic key different from the first key, wherein the vehicle is communicably connected with a communication terminal by short distance wireless communication, determining whether to accept the received registration request based upon whether the vehicle is unlocked using the first key, authenticating the second key associated with the registration request in a case where it is determined to accept the registration request, and registering the authenticated second key in response to successful authentication of the second key, receiving a transmission request of information concerning at least one registered second key from the communication terminal by the short distance wireless communication, and determining whether to accept the received transmission request based upon whether the vehicle is unlocked using the first key.

10. The vehicle according to claim 9, wherein the vehicle further performs:

receiving an invalidation request of at least one registered second key from the communication terminal by the short distance wireless communication, and determining, on condition that the vehicle is unlocked by the first key, whether to accept the received invalidation request.

11. An in-vehicle device of a vehicle configured to cancel restriction of at least one function, which includes restriction of a function enabling an actuation of a power unit of the vehicle, by unlock of a first key which is a smart key held by the driver and a smart control unit mounted in the vehicle body of the vehicle, thereby performing authentication of the smart key, where the vehicle is unlocked using the first key, wherein the in-vehicle device performs:

receiving a registration request of a second key that is an electronic key different from the first key, wherein the in-vehicle device is communicably connected with a communication terminal by short distance wireless communication, determining whether to accept the received registration request based upon whether the vehicle is unlocked using the first key, authenticating the second key associated with the registration request in a case where it is determined to accept the registration request, and registering the authenticated second key in response to successful authentication of the second key, receiving a transmission request of information concerning at least one registered second key from the communication terminal by the short distance wireless communication, and determining whether to accept the received transmission request based upon whether the vehicle is unlocked using the first key.

12. The in-vehicle device according to claim 11, wherein the in-vehicle device further performs:

receiving an invalidation request of at least one registered second key from the communication terminal by the short distance wireless communication, and determining, on condition that the vehicle is unlocked by the first key, whether to accept the received invalidation request.

13. A management method of an electronic key, the method comprising:

a first reception step of receiving, by an electronic key server, an issuance request of the electronic key from a communication terminal;

a generation step of generating, by the electronic key server, the electronic key based on the issuance request;

a transmission step of transmitting, by the electronic key server, the generated electronic key to the communication terminal;

a second reception step of receiving, by a vehicle, a registration request to register the electronic key from the communication terminal;

unlocking the vehicle using a first key;

a first determination step of determining, by the vehicle, whether to accept the registration request based on whether the vehicle is unlocked using the first key, where the first key is a smart key held by the driver and a smart control unit mounted in the vehicle body of the vehicle, thereby performing authentication of the smart key and which cancels restriction of a function enabling an actuation of a power unit of the vehicle; and a registration step of authenticating, by the vehicle, the electronic key, which is different from the first key, wherein the vehicle is communicably connected with the communication terminal by short distance wireless communication, associated with the registration request in a case where it is determined, in the first determination step, to accept the registration request, and registering the authenticated electronic key in response to successful authentication of the second key, a third reception step of receiving a transmission request of information concerning at least one registered second key from the communication terminal by the short distance wireless communication, and a second determination step of determining whether to accept the received transmission request based upon whether the vehicle is unlocked using the first key.

14. The management method according to claim 13, further comprising:

a fourth reception step of receiving an invalidation request of at least one registered second key from the communication terminal by the short distance wireless communication, and a third determination step of determining, on condition that the vehicle is unlocked by the first key, whether to accept the received invalidation request.

* * * * *